United States Patent [19]

Krakovsky

[11] 4,373,546

[45] Feb. 15, 1983

[54] LONG LIFE VALVE

[76] Inventor: Rafael Krakovsky, 1022 University Blvd. East, Apt.#322, Silver Spring, Md. 20903

[21] Appl. No.: 210,786

[22] Filed: Nov. 26, 1980

[51] Int. Cl.³ .................................................. F16K 29/00
[52] U.S. Cl. .................................. 137/330; 251/205; 251/301
[58] Field of Search ................... 137/330, 331, 625.3, 137/625.31; 251/205, 193, 195, 176, 267, 270, 326, 327, 210, 298, 299, 300, 301; 138/45, 46

[56] References Cited

U.S. PATENT DOCUMENTS

| | | | |
|---|---|---|---|
| 133,414 | 11/1872 | Coyne | 251/301 |
| 786,043 | 3/1905 | Luckett | 137/331 |
| 851,182 | 4/1907 | Rowbotham | 137/331 |
| 948,132 | 2/1910 | Clark | 137/331 |
| 1,004,845 | 10/1911 | Böhme | 251/210 |
| 1,137,194 | 4/1915 | Dewrance | 251/176 |
| 1,324,351 | 12/1919 | Haynes | 251/195 |
| 1,586,345 | 5/1926 | Wilson | 251/267 |
| 1,602,936 | 10/1926 | Reeves | 137/330 |
| 3,191,381 | 6/1965 | Lerwick et al. | 251/301 |

FOREIGN PATENT DOCUMENTS

| | | | |
|---|---|---|---|
| 442869 | 9/1912 | France | 251/301 |
| 446565 | 12/1912 | France | 251/301 |
| 884307 | 12/1961 | United Kingdom | 251/176 |

*Primary Examiner*—George L. Walton
*Attorney, Agent, or Firm*—Laurence R. Brown

[57] ABSTRACT

In order to increase life of a disc type valve, which exhibits wear in the presence of fluid flow, a circular freely rotatable closure disc is provided so disposed in its closure path to engage flow apertures asymmetrically thereby inducing a rotary motion which presents a randomly positioned part of the disc periphery in the wear position. Life is thereby substantially increased by distributing wear evenly about the entire periphery of the closure disc.

A fast close embodiment is of the rotary disc type operable by a lever to move a flat disc surface over a flat seat containing a flow aperture of smaller dimension than the disc. The disc in accordance with this invention is freely rotatable and the movement path of the disc axis of rotation is asymmetrically disposed relative to the geometric center of the aperture to thereby induce rotation of the disc with random rotational positioning of the disc periphery over the flow aperture, thereby distributing wear about the entire disc periphery.

2 Claims, 4 Drawing Figures

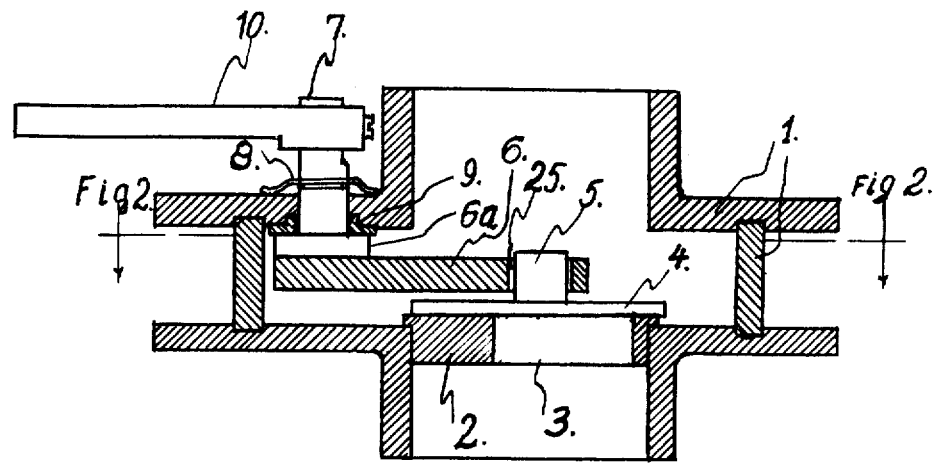
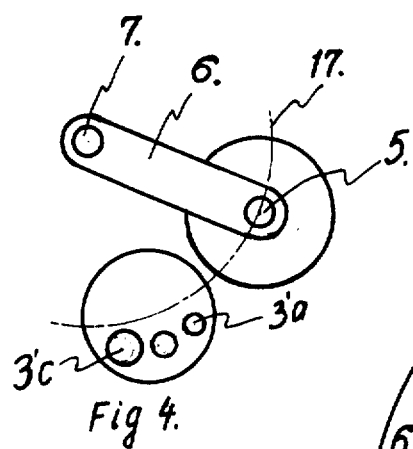
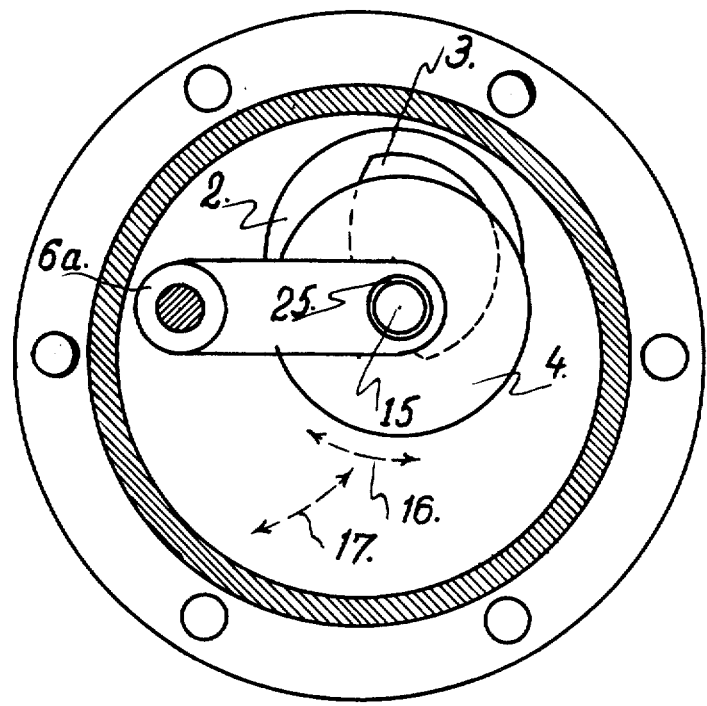
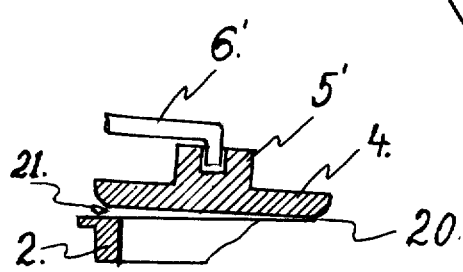
Fig. 1.
Fig. 4.
Fig. 3.
Fig. 2.

LONG LIFE VALVE

TECHNICAL FIELD

This invention relates to valve methods and apparatus and more particularly it relates to prolonging life of valves having rotating aperture closure discs.

BACKGROUND ART

Rotatable disc type valves having discs rotated into place to close an aperture have long been known. Thus, U.S. Pat. No. 3,512,751—T. W. Fitzgerald—May 19, 1970 shows a typical such valve disc rotated about a pivot axis outside an aperture to cover the aperture opening. This discloses a fast release lever operated valve embodiment. Such valves may be used as fast opening blow-off valves in boilers, etc. as shown in pages 7 to 9 of the Stationary Engineering, Home Study Course by the National Association of Power Engineers.

Another version of these valves, also known as "everlasting" valves is shown in U.S. Pat. No. 3,788,346—T. W. Fitzgerald—Jan. 29, 1974, where the disc itself is given a rotary action as it is being seated by means of a compound lever arrangement and confined housing path.

This type of valve has the advantage of long life because of the shear action of the disc over the mating seat provided about the aperture flow path to be controlled. However, it has been found in accordance with this invention that conventional valves of this type are subject to wear by the fluid flow through the valve resulting in a wear-down of the edges of the control disc. This not only changes valve closure characteristics in the flow path, but also prevents the operation of the shear cleaning action of the disc in passing across the aperture facing, even to the extent of letting particles ride between the disc and facing to lift the valve disc away from its closed position, particularly when the valve disc is biased only by water pressure and covers a single aperture facing. Thus, the life of these valves is materially shortened, and it is therefore an objective of this invention to further improve the long life characteristics of such rotary disc type valves and to correct the wear deficiencies of the prior art.

BRIEF DISCLOSURE OF THE INVENTION

In order to improve valve performance and life, a circular valve disc of greater surface area than the aperture to be closed is mounted for free rotation during the closure. The disc and aperture are relatively moved in a mode which causes random rotational positioning of the disc in the valve closing and opening actions thereby to distribute wear on the edge of the disc caused from fluid flow about the entire disc periphery. Thus, the aperture may be asymmetrical in shape or asymmetrically disposed about the movement path of the center of the rotary disc to thereby generate a turning moment on the rotary disc by flow of fluid through the closure aperture as it is relatively moved in or out of closure position, to present a random peripheral segment of the disc to the fluid flow thereby distributing wear about the entire disc periphery.

Other features, advantages and objectives of the invention are found throughout the following drawing, description and claims.

BRIEF DESCRIPTION OF DRAWINGS

In the drawing:

FIG. 1 is a view, partially in section of a fast close valve embodiment of the invention;

FIG. 2 is a top view, partly in section, of the valve of FIG. 1;

FIG. 3 is a segmental sketch, partly in section, of a valve closure disc assembly; and FIG. 4 is a sketch illustrating valve closure disc and flow aperture operation in accordance with the principles of this invention.

DETAILED DESCRIPTION OF PREFERRED EMBODIMENTS

As may be seen from the views of FIGS. 1 through 4, a fast close rotary closure disc valve arrangement embodies the invention. The housing 1 defines a fluid flow path in the direction defined by the arrows. Control of the fluid flow through this path is effected in part by means of a valve seat 2 presenting a flow control aperture 3. Also the seat 2 presents a flat face for receiving in mating sliding registration thereacross the closure disc 4 as pivoted by means of internal lever arm 6 and hand lever 10 externally available outside housing 1. The pivot shaft 7, of course, is affixed non-rotatably within pivot arm 6 at extremity 6a or is integral therewith. Suitable fluid seals or packing 9 is provided as well as retaining means such as clip or threaded cap 8. The handle 10 is removably attached to a flattened shaft by the set screw. Preferably the valve parts are held together by means of the bolts shown, but may be welded, etc.

In accordance with this invention, the closure disc 4 is circular and has a stem 5 held loosely by the pivot arm 6 for free rotation of the circular closure disc 4, in suitable manner as shown in FIGS. 1 and 3. The fluid pressure in the flow direction serves to bias the closure disc 4 against the flat surface of seat 2.

As can be seen from both FIGS. 1 and 2, the geometric center of aperture 3 is located off the path of the axis center of the rotatable disc 4. This critical provision effects a rotational torque on the rotatable disc 4 by means of fluid flow through the aperture thereby presenting a random position of the peripheral disc edge in registration with the aperture as the pivot arm 6 moves in and out of closure position.

This rotational torque can be provided as in FIGS. 1 and 2 by an asymmetrically shaped aperture which provides an unbalanced flow force on the disc 4 on opposite sides of the axial center of rotation 15. Thus, the disc 4 loosely held in the pivot arm 6, free to rotate as shown by arrows 16 is caused to rotate enough to present different parts of the disc periphery over the flow aperture, particularly as the lever moves the disc center of rotation 15 over the arc 17.

The aperture need not be a single one, nor asymmetrically shaped to attain this mode of operation as shown in FIG. 4. It is evident that if the flow path for fluids is not evenly balanced on opposite sides of the center of disc gravity arcuate path 17 that the disc 4 will be caused to rotate and present different peripheral edges to the flow aperture opening from time to time.

This mode of operation significantly increases wear and life, as may be seen from the wear edges 20 on disc 4 illustrated in FIG. 3. That is, the disc edges take the wear due to fluid flow in this arrangement. It can be seen therefore that as the edges wear, the closure control cut-off action deteriorates and the ability of the sharp disc edges in its shear action to remove particles not only deteriorates but may even permit particles 21 to slide under the worn edges and cause leakage.

As seen from FIGS. 2 or 4, it is evident that without disc 4 rotation, a small portion of the circular disc peripheral rim would be subject to wear and thus wear would progress much faster. Thus, in accordance with this invention it is important not to impede the free rotation of disc 4 in any way. Accordingly, the clearance 25 about the disc stem 5 and 6 the clearance 26 below the pivot arm 6 are important.

It is evident therefore that the present invention has improved the state of the art by making valves of the sliding disc type more reliable over longer periods of use. Therefore those features of novelty believed descriptive of the spirit and nature of this invention are defined with particularity in the following claims.

I claim:

1. The method of controlling fluid flow in a valve for regulating a variable flow of fluid having valve members including a circular apertureless flat surface disc type closure member movable in sliding registration across a flat surface having therein flow aperture structure to variably restrict the flow path opening size in a manner to extend the operable life of the valve by reducing wear about the disc perimeter edge induced by sliding registration and by fluid flow erosion of the disc peripheral edges comprising the steps of:

mounting the circular apertureless flat surface disc closure member about its geometric center so that it may rotate as it is moved across the flow aperture in sliding registration to open and close a flow path, providing said flow aperture structure in the valve of an aperture size substantially smaller than the disc for registration therewith, establishing a flat valve seat surface to receive the flat disc surface in sliding motion thereacross for sealing in place substantially solely by fluid pressure on the disc, orienting in the valve seat said flow aperture structure with a major portion thereof asymmetrically disposed to one side of the movement path of the center of said disc sufficient to generate a turning movement rotating the disc as it slides into registration by means of the asymmetrical position of the flow path on the rotary disc by reaction of fluid pressure and flow at the aperture while the disc is being moved into or out of registration with the valve seat, and sliding the flat disc surface into and out of registration across the flat valve seat surface to at least partly close the aperture in a mode inducing the random rotational positioning of the disc edge as a function of the fluid pressure and flow to thereby distribute wear induced on the disc edge by fluid flow through the aperture about the entire disc periphery.

2. A valve combination for reducing wear about the edge of a flat surface circular disc closure member, comprising in combination, a housing containing the valve, a first valve member defining a fluid conduit flow path through the housing and presenting aperture structure located in a registration seat with a flat surface adaptable to closure by sliding movement of the flat surface of the closure member thereacross, an apertureless flat surface disc closure member movably confined by the housing to slide across said seat relative to said aperture structure and register on said seat to at least partially close the aperture and thereby regulate the flow path, said closure member comprising a rotatably mounted circular disc of substantially greater surface area than the aperture structure disposed to be held on the seat substantially solely by fluid pressure, said aperture structure disposed within said seat with a major aperture portion thereof asymmetrically disposed to one side of the path of the center of the disc sufficient to generate a turning moment rotating the disc by fluid flow and pressure at the aperture as the valve is closed or opened, and movement means for relatively sliding the position of the disc in and out of registration with the aperture to open and close the aperture and thereby to control fluid flow in a movement mode that causes the disc to rotate during the movement thereof in and out of registration with the aperture by reaction with fluid flow and pressure at the aperture to rotate and therefore seat the disc in random positions with different disc edge positions exposed to fluid flow through the aperture whereby wear on the disc due to fluid flow through the aperture is distributed about the entire circumferential periphery of the disc to thereby significantly improve valve life.

* * * * *